(12) United States Patent
Patterson et al.

(10) Patent No.: US 8,893,382 B2
(45) Date of Patent: Nov. 25, 2014

(54) COMBUSTION SYSTEM AND METHOD OF ASSEMBLING THE SAME

(75) Inventors: David Bruce Patterson, Mason, OH (US); Donald Michael Corsmeier, West Chester, OH (US); Craig Douglas Young, Maineville, OH (US); Donald Lee Gardner, West Chester, OH (US); James Edward Thompson, Liberty Township, OH (US); Daniel Dale Brown, Cincinnati, OH (US); Glenn Edward Wiehe, Cincinnati, OH (US); Donald Scott Yeager, Loveland, OH (US); Mark Willard Marusko, Springboro, OH (US); Michael Joseph Zerbe, Palm Harbor, FL (US)

(73) Assignee: General Electric Company, Schenectady, NY (US)

(*) Notice: Subject to any disclaimer, the term of this patent is extended or adjusted under 35 U.S.C. 154(b) by 102 days.

(21) Appl. No.: 13/249,868

(22) Filed: Sep. 30, 2011

(65) Prior Publication Data

US 2013/0081270 A1 Apr. 4, 2013

(51) Int. Cl.
*B23P 17/00* (2006.01)
*F23R 3/50* (2006.01)
*F23R 3/00* (2006.01)
*F23R 3/60* (2006.01)

(52) U.S. Cl.
CPC . *F23R 3/50* (2013.01); *F23R 3/002* (2013.01); *F23R 3/60* (2013.01); *Y02E 20/16* (2013.01)
USPC .............................. 29/889.2; 29/888; 60/722

(58) Field of Classification Search
CPC .............. F23R 3/002; F23R 3/60; F01D 9/02; F01D 9/042; B23P 15/008
USPC ............ 29/559, 889.2; 415/137; 60/752, 796, 60/798, 800
See application file for complete search history.

(56) References Cited

U.S. PATENT DOCUMENTS

| 2,622,843 | A | * | 12/1952 | Williams ........................ 415/137 |
| 4,363,208 | A | | 12/1982 | Hoffman et al. |
| 4,597,258 | A | | 7/1986 | Harris |
| 5,524,430 | A | * | 6/1996 | Mazeaud et al. ................ 60/798 |
| 5,701,733 | A | | 12/1997 | Lewis et al. |
| 6,453,675 | B1 | | 9/2002 | Royle |
| 6,655,149 | B2 | * | 12/2003 | Farmer et al. ................... 60/754 |

(Continued)

FOREIGN PATENT DOCUMENTS

| EP | 1394470 A2 | 3/2004 |
| GB | 2135440 A | 8/1984 |
| GB | 2263733 A | 8/1993 |

OTHER PUBLICATIONS

Extended European Search Report for Application No. 12186089.4 dated Jun. 11, 2013, 6 pages.

*Primary Examiner* — Alexander P Taousakis
*Assistant Examiner* — Lee A Holly
(74) *Attorney, Agent, or Firm* — William Scott Andes, Esq.; Armstrong Teasdale LLP (57) ABSTRACT

A method of assembling a combustion system for a gas turbine engine includes providing a combustion chamber frame, an inner casing structure, and an outer casing structure. The method also includes mounting the combustion chamber frame between the inner casing structure and the outer casing structure such that the combustion chamber frame is coupled to the inner casing structure and the outer casing structure.

20 Claims, 10 Drawing Sheets

(56) References Cited

U.S. PATENT DOCUMENTS

| | | |
|---|---|---|
| 7,024,863 B2 | 4/2006 | Morenko |
| 7,765,809 B2 * | 8/2010 | Brown et al. ............... 60/752 |
| 8,156,724 B2 * | 4/2012 | Milner .................... 60/39.23 |
| 2003/0167772 A1 * | 9/2003 | Farmer et al. ............... 60/754 |
| 2004/0123599 A1 * | 7/2004 | Ackermann et al. ........... 60/770 |
| 2005/0034460 A1 * | 2/2005 | McMasters et al. ........... 60/752 |
| 2007/0119180 A1 | 5/2007 | Zigan et al. |
| 2007/0157618 A1 * | 7/2007 | Manteiga et al. ............. 60/752 |
| 2011/0067404 A1 | 3/2011 | Johnson et al. |

* cited by examiner

COMBUSTION SYSTEM AND METHOD OF ASSEMBLING THE SAME

BACKGROUND OF THE INVENTION

The field of this disclosure relates generally to combustion systems and, more particularly, to a gas turbine engine combustion system and a method of assembling the same.

Many known gas turbine engines include a combustion system for mixing fuel with compressed air and igniting the mixture to produce combustion gases. The combustion gases are directed into a turbine system to drive a turbine into rotation, thereby driving a fan, a compressor, and/or a generator rotatably coupled to the turbine. In some gas turbine engines (e.g., propelling gas turbine engines on an aircraft), the combustion gases are exhausted from the turbine system into the ambient air, thereby providing thrust for the aircraft. In some other gas turbine engines (e.g., gas turbine engines in a combined cycle power plant), the combustion gases are directed from the turbine system into a heat recovery steam generator for use in producing steam.

Most known combustion systems experience significant temperature and pressure gradients associated with the combustion process. These temperature and pressure gradients can be a source of stress on the combustion system. As such, it would be useful to provide a combustion system that facilitates efficient operation of the gas turbine engine, while better withstanding the temperature and pressure gradients associated with the combustion process.

BRIEF DESCRIPTION OF THE INVENTION

In one aspect, a method of assembling a combustion system for a gas turbine engine is provided. The method includes providing a combustion chamber frame, an inner casing structure, and an outer casing structure. The method also includes mounting the combustion chamber frame between the inner casing structure and the outer casing structure such that the combustion chamber frame is coupled to the inner casing structure and the outer casing structure.

In another aspect, a combustion system for a gas turbine engine is provided. The combustion system includes an inner casing structure and an outer casing structure. The combustion system further includes a combustion chamber frame mounted between the inner casing structure and the outer casing structure such that the combustion chamber frame is coupled to the inner casing structure and the outer casing structure.

In another aspect, a combustion chamber frame for a gas turbine engine combustion system having an inner casing structure and an outer casing structure is provided. The combustion chamber frame includes an inner frame segment, an outer frame segment, and an intermediate frame segment extending from the inner frame segment to the outer frame segment. The combustion chamber frame is configured to be mounted between the inner casing structure and the outer casing structure such that the inner frame segment is coupled to the inner casing structure and such that the outer frame segment is coupled to the outer casing structure.

DETAILED DESCRIPTION OF THE INVENTION

The following detailed description sets forth a combustion system and a method of assembling the same by way of example and not by way of limitation. The description should clearly enable one of ordinary skill in the art to make and use the combustion system, and the description sets forth several embodiments, adaptations, variations, alternatives, and uses of the combustion system, including what is presently believed to be the best mode thereof The combustion system is described herein as being applied to a preferred embodiment, namely a gas turbine engine. However, it is contemplated that the combustion system and the method of assembling the same have general applications in a broad range of systems and/or a variety of other commercial, industrial, and/or consumer applications.

Figure 1:
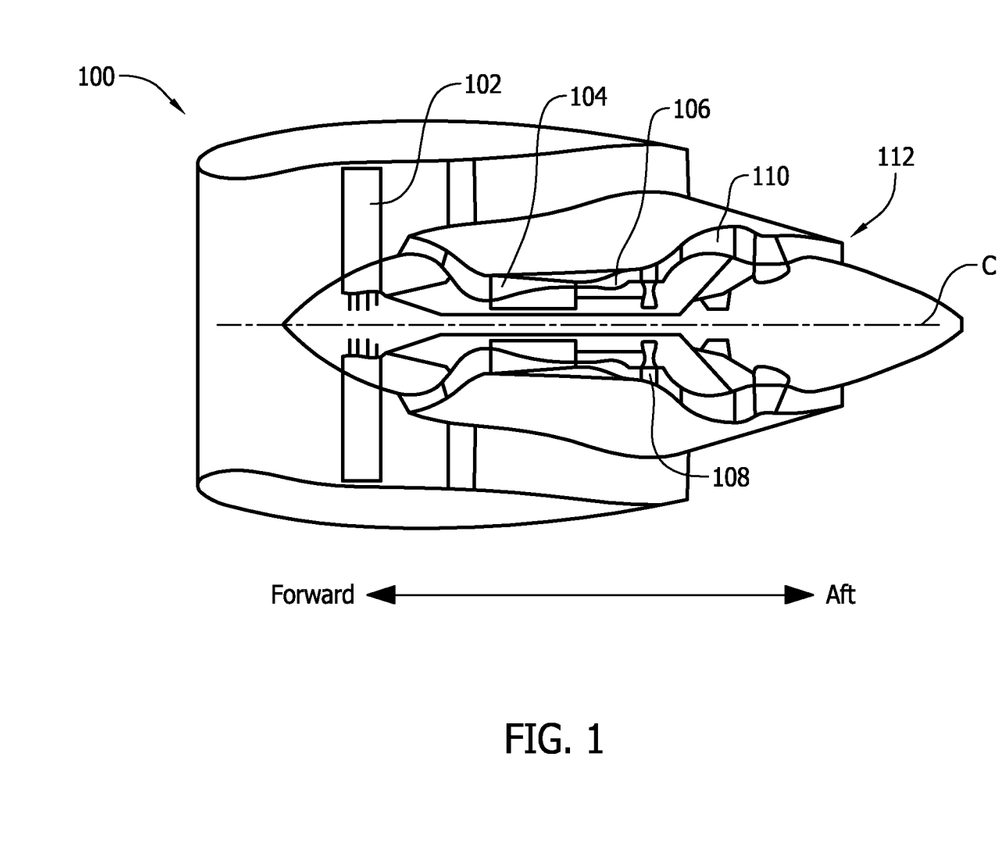
FIG. 1 is a schematic illustration of an exemplary gas turbine engine.
Figure 2:
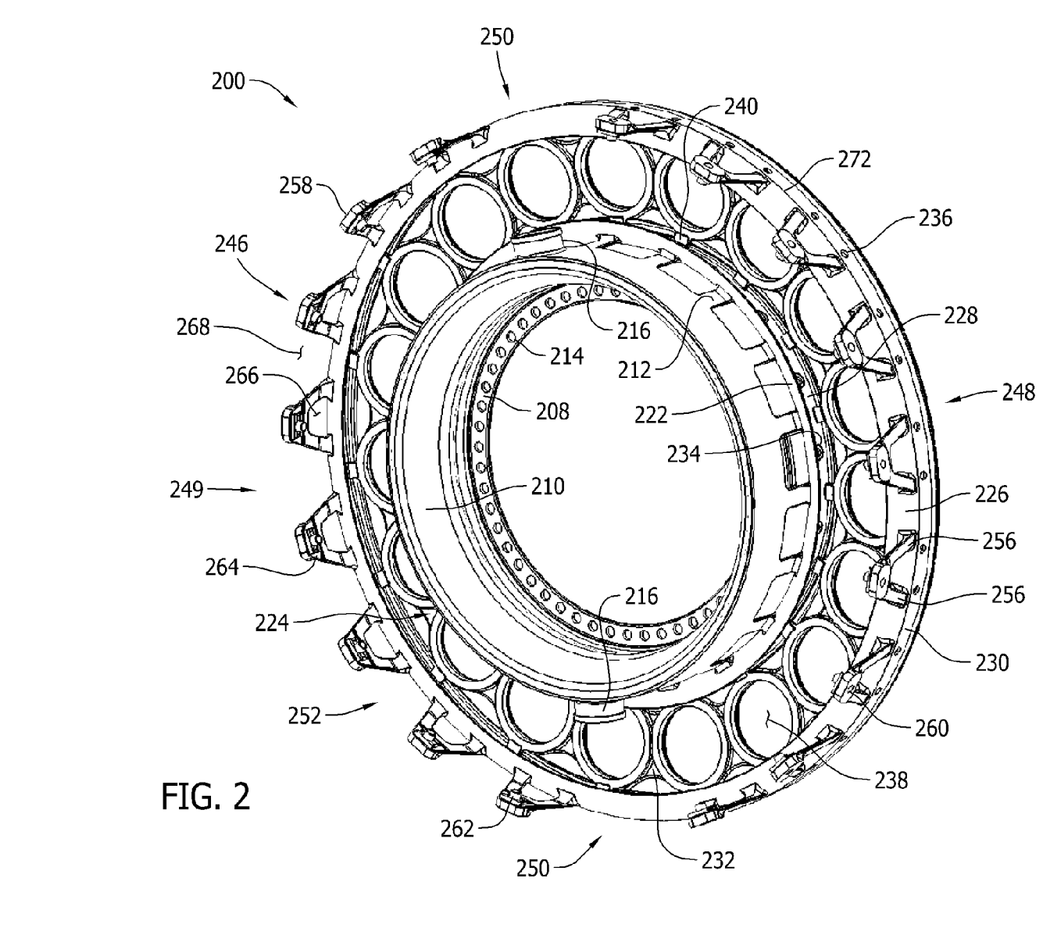
FIG. 2 is a forward perspective view of a combustion chamber frame for use in the gas turbine engine shown in FIG. 1.
Figure 3:
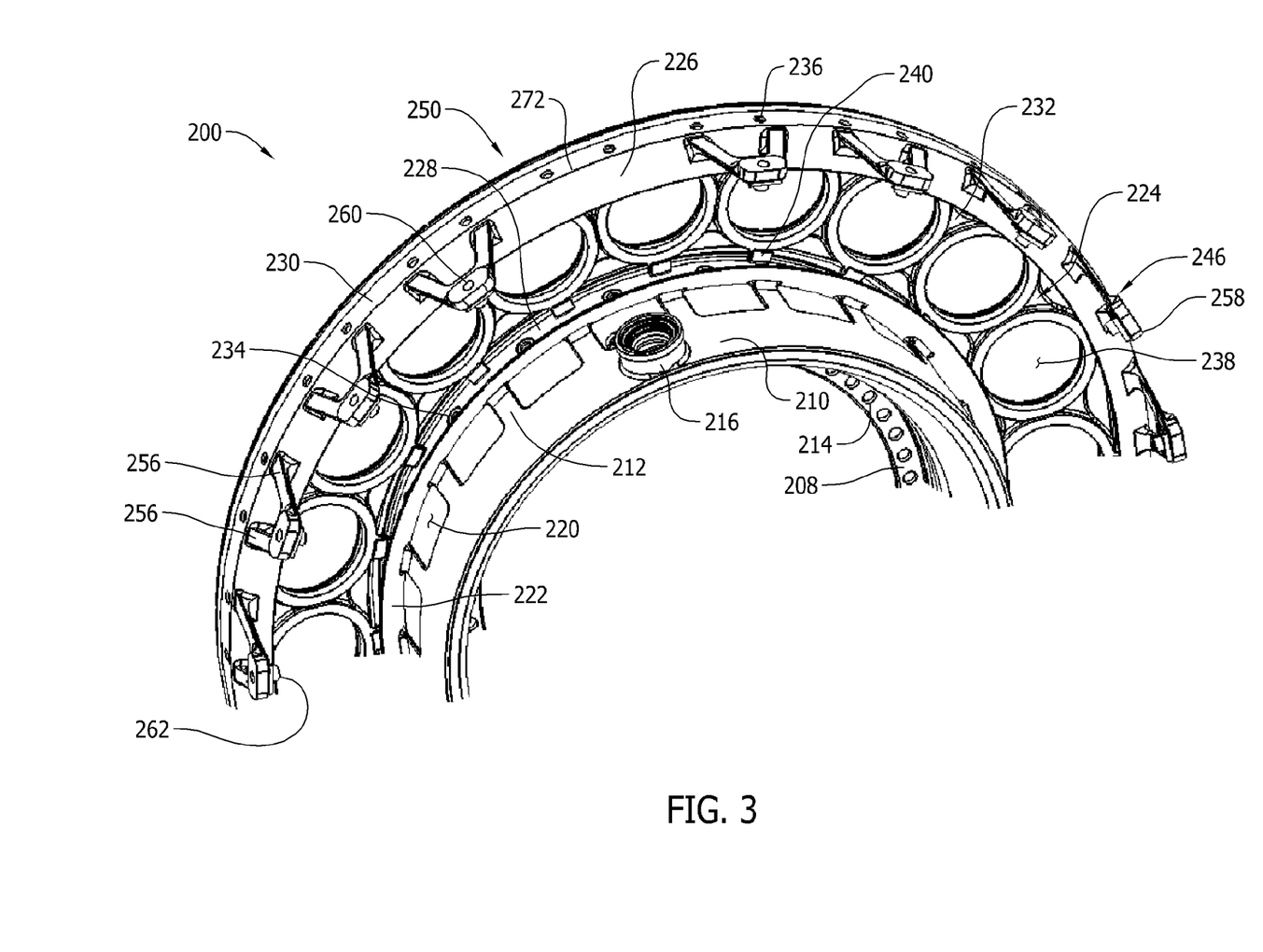
FIG. 3 is an enlarged portion of the forward perspective view of the combustion chamber frame shown in FIG. 2.
Figure 4:
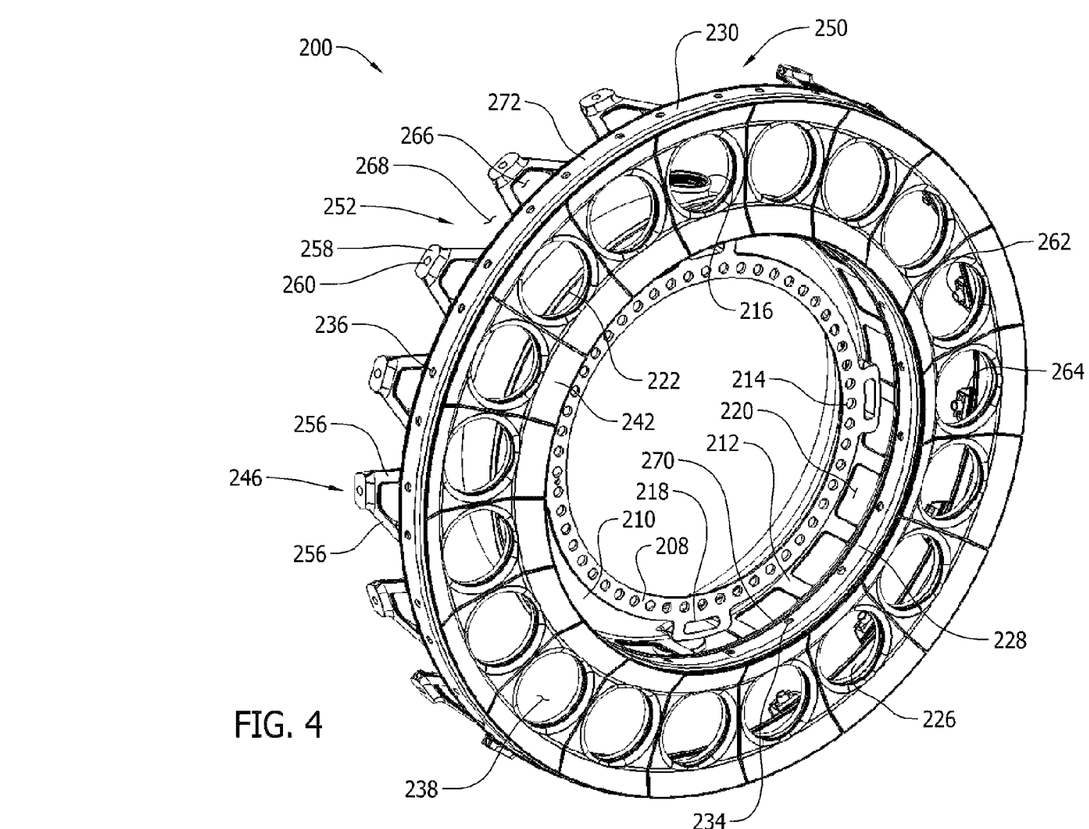
FIG. 4 is an aft perspective view of the combustion chamber frame shown in FIG. 2.
Figure 5:
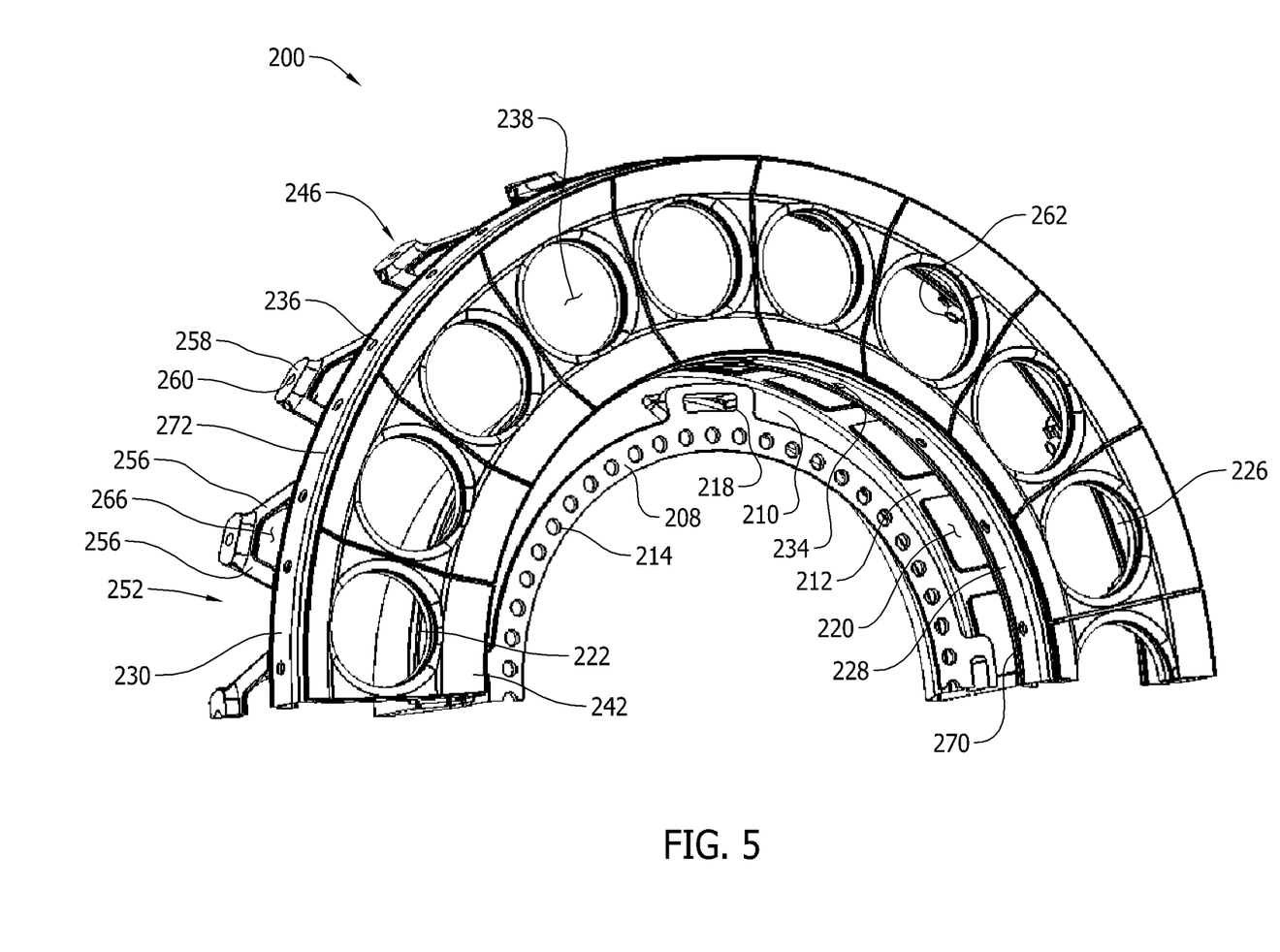
FIG. 5 is an enlarged portion of the aft perspective view of the combustion chamber frame shown in FIG. 4.

FIG. 1 is a schematic illustration of an exemplary gas turbine engine 100 including a fan system 102, a compressor system 104, a combustion system 106, a high pressure turbine system 108, and a low pressure turbine system 110 that are aligned along a centerline axis C. In operation, air flows through fan system 102 and is supplied to compressor system 104. The compressed air is delivered to combustion system 106, in which it is mixed with fuel and ignited to produce combustion gases. The combustion gases flow from combustion system 106 through turbine systems 108, 110 and exit gas turbine engine 100 via an exhaust system 112. In other embodiments, gas turbine engine 100 may include any suitable number of fan systems, compressor systems, and/or turbine systems arranged in any suitable manner.

Figure 6:
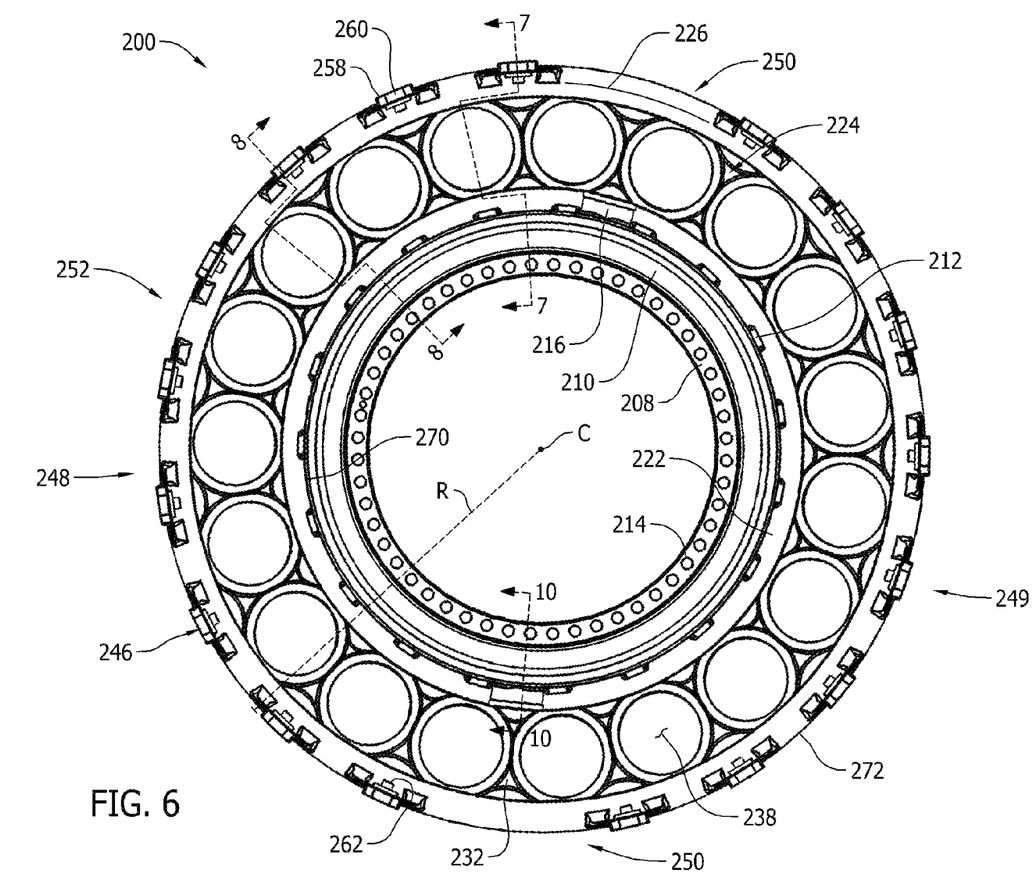
FIG. 6 is a forward view of the combustion chamber frame shown in FIG. 2.
Figure 7:
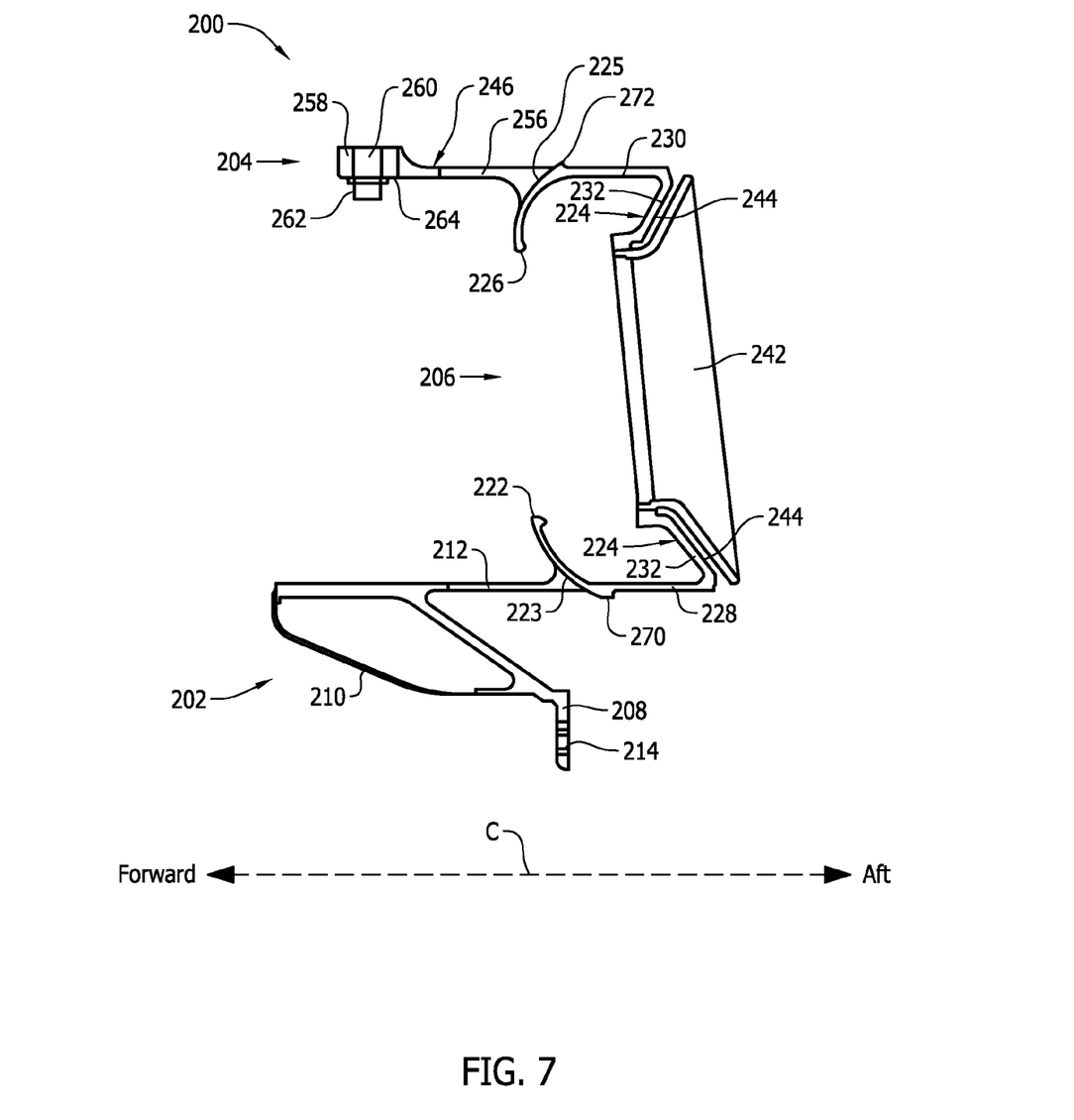
FIG. 7 is a sectional view of the combustion chamber frame shown in FIG. 6 taken along line 7-7.

FIGS. 2 through 6 are perspective views of a combustion chamber frame 200 of combustion system 106, and FIG. 7 is a sectional view of combustion chamber frame 200 taken along line 7-7 of FIG. 6. As used in FIGS. 2 through 7, references to combustion chamber frame 200 in terms of orientation within gas turbine engine 100 (e.g., references such as "component X of combustion chamber frame 200 extends 'axially forward' or 'axially aft' of component Y of combustion chamber frame 200) are intended to mean that combustion chamber frame 200 is configured to be oriented in such a manner when combustion chamber frame 200 is mounted within gas turbine engine 100 as described herein, and such references to orientation are not intended to limit the scope of this disclosure to only those combustion chamber frames 200 that are actually mounted within gas turbine engine 100. Rather, this disclosure is intended to apply to combustion chamber frames 200 in general, whether mounted within a gas turbine engine or not.

Combustion chamber frame 200 is annular about axis C such that combustion chamber frame has a radius R. Combustion chamber frame 200 includes an inner frame segment 202, an outer frame segment 204, and an intermediate frame segment 206 that extends from inner frame segment 202 to outer frame segment 204. In the exemplary embodiment, inner frame segment 202, outer frame segment 204, and intermediate frame segment 206 are integrally formed together from the same material. In some embodiments, inner frame segment 202, outer frame segment 204, and/or intermediate frame segment 206 may be formed separately from, and coupled to, one another using any suitable coupling process (e.g., a welding process). In other embodiments, inner frame segment 202, outer frame segment 204, and/or intermediate frame segment 206 may be formed from different materials.

Inner frame segment 202 includes an inner flange 208, a plenum 210, and a plurality of joints 212. Inner flange 208, plenum 210, and joints 212 are integrally formed together. Inner flange 208 extends radially inward from plenum 210 and includes a plurality of circumferentially spaced inner flange bolt holes 214. Plenum 210 extends axially forward from inner flange 208 and includes a pair of diametrically opposed, radially extending valve adapters 216, along with four equally spaced, aft facing outlet slots 218. Joints 212 are circumferentially spaced apart from one another and extend from plenum 210 to intermediate frame segment 206 to define a plurality of inner liner cooling flow intake apertures 220. In the exemplary embodiment, inner liner cooling flow intake apertures 220 are generally rectangular in shape. In other embodiments, inner liner cooling flow intake apertures 220 may have any suitable shape that facilitates enabling combustion chamber frame 200 to function as described herein. Suitably, inner frame segment 202 may have any number and size of inner flange bolt holes 214, valve adapters 216, outlet slots 218, and/or inner liner cooling flow intake apertures 220 to suit the desired aerodynamic and/or thermodynamic properties of the associated gas turbine engine or other system within which combustion chamber frame 200 is to be mounted.

Intermediate frame segment 206 includes an arcuate inner cowl 222, a dome structure 224, and an arcuate outer cowl 226 that are integrally formed together. Inner cowl 222 is annular and is disposed between joints 212 of inner frame segment 202 and dome structure 224, and outer cowl 226 is annular and is disposed between outer frame segment 204 and dome structure 224 such that dome structure 224 extends from inner cowl 222 to outer cowl 226. A curved forward surface 223 of inner cowl 222 defines the aft portion of the perimeter of each inner liner cooling flow intake aperture 220 to facilitate a smoother (i.e., less restricted) airflow therethrough. Dome structure 224 includes an inner rim 228, an outer rim 230, and a web 232 that extends from inner rim 228 to outer rim 230. Inner rim 228 has an inner lip 270 and a plurality of circumferentially spaced inner liner bolt holes 234, and outer rim 230 has an outer lip 272 and a plurality of circumferentially spaced outer liner bolt holes 236.

Web 232 defines a plurality of circumferentially arranged, substantially axially oriented eyelets 238. In some embodiments, inner rim 228 may also have a plurality of circumferentially spaced, radially outward extending tabs 240 disposed between inner cowl 222 and inner liner bolt holes 234 such that one tab 240 is associated with, and disposed below, each eyelet 238. In the exemplary embodiment, a plurality of deflectors 242 are coupled to (e.g., brazed to) web 232 such that each deflector 242 circumscribes a respective one eyelet 238 to collectively facilitate shielding an aft face 244 of web 232 from heat associated with the combustion process, as described in more detail below. In other embodiments, deflectors 242 may be integrally formed together as a single, annular deflector unit that is coupled to web 232. Suitably, intermediate frame segment 206 may have any number and size of inner liner bolt holes 234, outer liner bolt holes 236, and/or eyelets 238 to suit the desired aerodynamic and/or thermodynamic properties of the associated gas turbine engine or other system within which combustion chamber frame 200 is to be mounted.

Outer frame segment 204 includes a plurality of circumferentially spaced supports 246 that are integrally formed with, and extend axially forward from, outer cowl 226 of intermediate frame segment 206. In the exemplary embodiment, supports 246 are arranged in one group 248 of nine supports 246 and another group 249 of eight supports 246, with spaces 250 between groups 248, 249 being larger than spaces 252 between individual supports 246 within each group 248, 249. Each space 250 is circumferentially aligned with one valve adapter 216 to facilitate providing clearance for cooling tubes 162 (FIG. 10), as described in more detail below. In other embodiments, supports 246 may be arranged in any suitable number of groups having any suitable number of supports 246 in each group. Alternatively, supports 246 may be equally spaced about the circumference of combustion chamber frame 200 (i.e., outer frame segment 204 may not have supports 246 arranged in groups).

Each support 246 includes a pair of obliquely oriented arms 256 that are joined together at a spacer 258 that defines a support bolt hole 260. In some embodiments, a fastening device may be coupled to spacer 258 about support bolt hole 260 (e.g., in the exemplary embodiment, a basket nut 262 is riveted to spacer 258 about support bolt hole 260 to facilitate providing greater tolerance when mounting combustion chamber frame 200 as described in more detail below, and a radially inner surface 264 of spacer 258 may therefore have a contour that is planar, rather than arcuate, to facilitate seating basket nut 262 against spacer 258). In other embodiments, a fastening device may not be coupled to spacer 258.

In the exemplary embodiment, each support 246 has a spacing between arms 256 that is greater at outer cowl 226 than at spacer 258 to define a substantially U-shaped outer liner cooling flow intake aperture 266. As such, each space 252 between adjacent supports 246 is an inverted substantially U-shaped outer liner cooling flow intake aperture 268. In this manner, each group 248, 249 of supports 246 has substantially U-shaped outer liner cooling flow intake apertures 266 that are interdigitated with inverted substantially U-shaped outer liner cooling flow intake apertures 268. A curved forward surface 225 of outer cowl 226 defines the axially aft portion of the perimeter of each substantially U-shaped outer liner cooling flow intake aperture 266 and each inverted substantially U-shaped outer liner cooling flow intake aperture 268 to facilitate a smoother (i.e., less restricted) airflow therethrough. In some embodiments, supports 246 may have a thickness in the radial direction that varies in the axial direction to facilitate bending induced by thermal gradients on combustion chamber frame 200 during operation (i.e., each support 246 may be thicker near spacer 258 and/or near outer cowl 226 than in area(s) therebetween to facilitate enabling supports 246 to bend during high cycle fatigue (HCF) or low cycle fatigue (LCF) of gas turbine engine 100). Alternatively, outer frame segment 204 may have any suitable number and size of supports 246 configured and spaced in any suitable manner to suit the desired aerodynamic and/or thermodynamic properties of the associated gas turbine engine or other system within which combustion chamber frame 200 is to be mounted.

Figure 8:
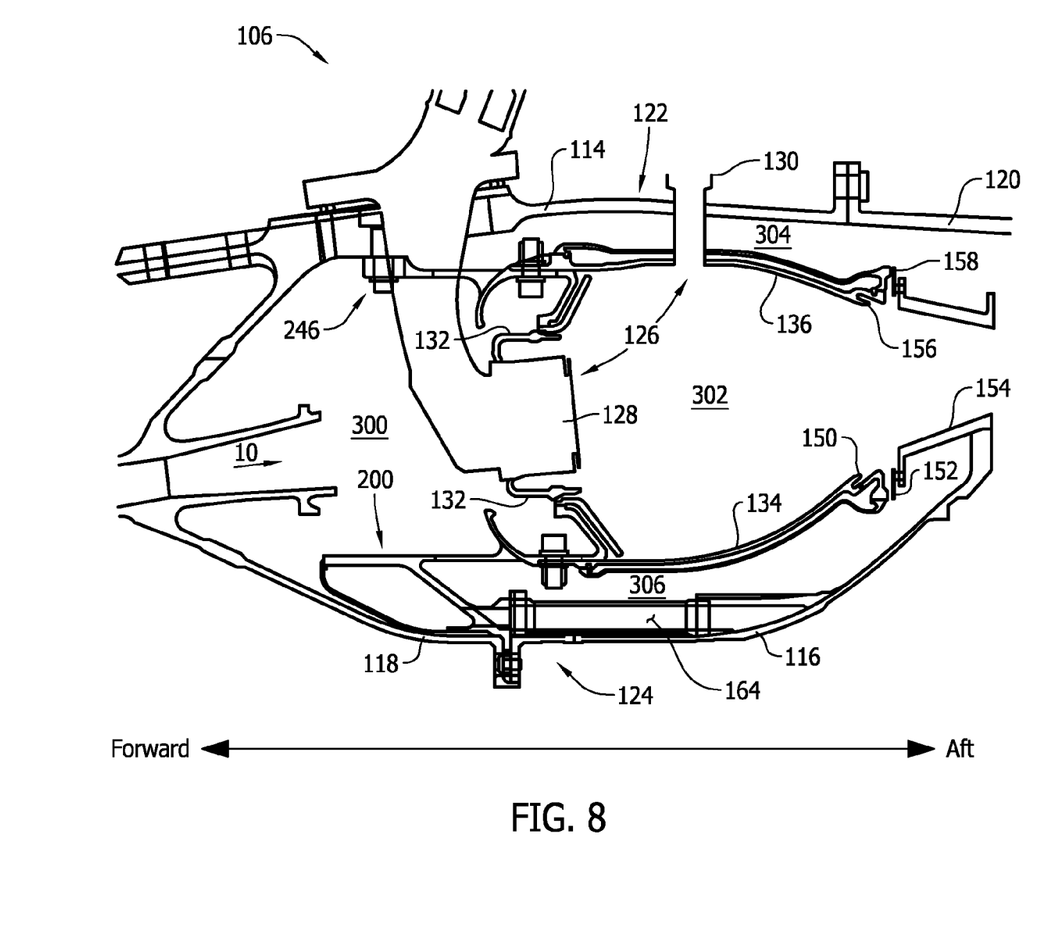
FIG. 8 is a schematic sectional illustration of a combustion system of the gas turbine engine shown in FIG. 1 having the combustion chamber frame shown in FIGS. 2-7 taken along line 8-8 of FIG. 6.
Figure 9:
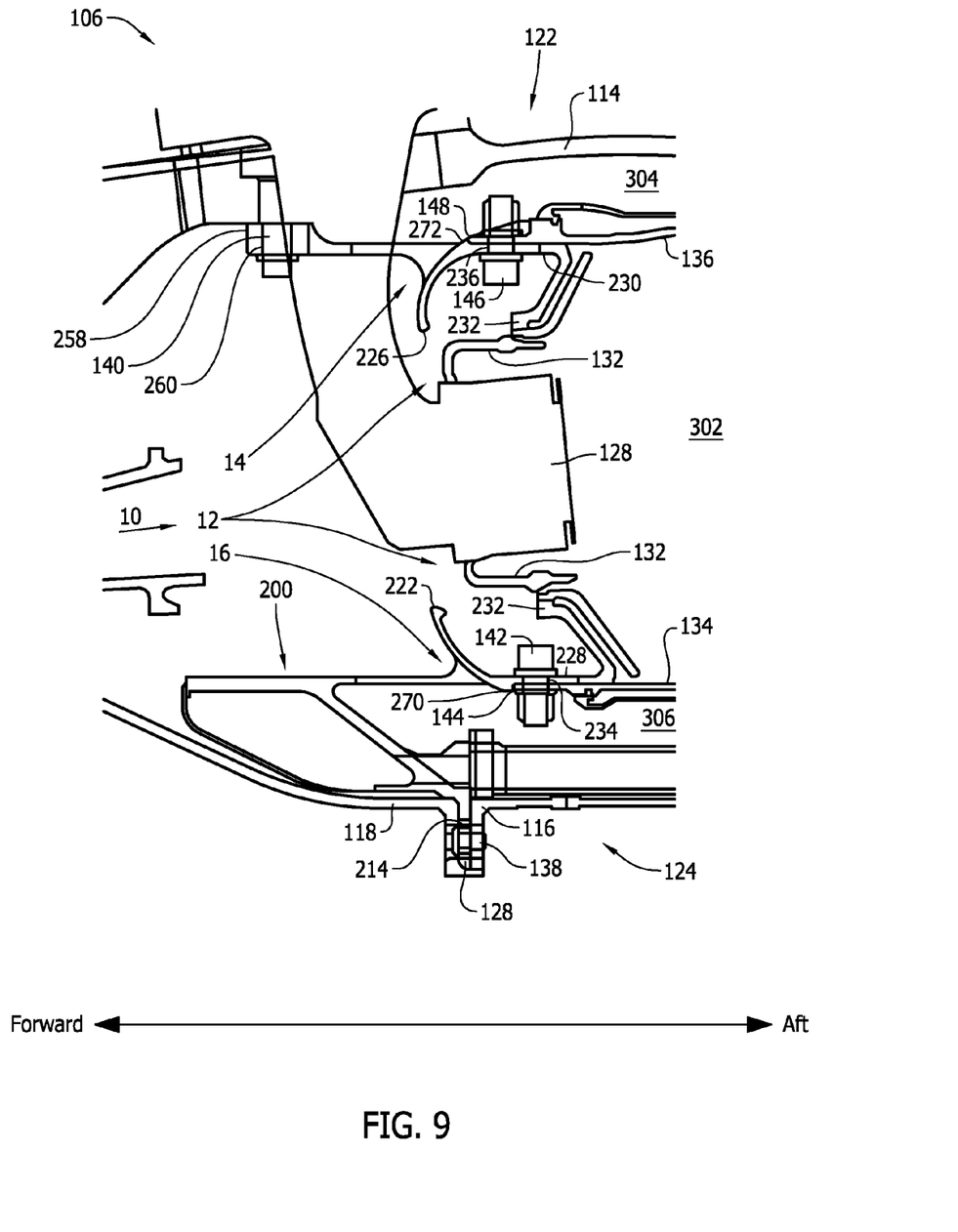
FIG. 9 is an enlarged portion of the schematic sectional illustration shown in FIG. 8.

FIGS. 8 and 9 are schematic sectional illustrations of combustion system 106 of gas turbine engine 100 having combustion chamber frame 200 taken along line 8-8 of FIG. 6. In the exemplary embodiment, combustion system 106 includes a combustor case 114 and a forward inner nozzle support (FINS) 116 coupled between a combustor/diffuser/nozzle (CDN) module 118 and a high pressure turbine (HPT) case 120 to define an outer casing structure 122 and an inner casing structure 124 of combustion system 106. Outer casing structure 122 and inner casing structure 124 define a flow path 300 for compressed air 10 discharged from compressor system 104.

Combustion system 106 further includes a combustion chamber 302 and a plurality of circumferentially spaced combustor assemblies 126 that each has a fuel nozzle 128, an igniter 130, and a mixer 132. Combustion chamber 302 has a forward boundary defined at least in part by combustion chamber frame 200 and radial boundaries defined at least in part by an inner liner 134 and an outer liner 136 coupled to, and extending aft from, combustion chamber frame 200. Combustion chamber frame 200 is coupled to inner casing structure 124 via inner flange 208 (i.e., inner flange 208 is bolted between FINS 116 and CDN 118 via a plurality of bolts 138 inserted through inner flange bolt holes 214). Combustion chamber frame 200 is also coupled to outer casing structure 122 via supports 246 (i.e., supports 246 are bolted to combustor case 114 via a plurality of bolts 140 inserted through support bolt holes 260 such that spacer 258 is fastened against outer casing structure 122).

Inner liner 134 is bolted to inner rim 228 of combustion chamber frame 200 via a plurality of bolts 142 inserted through inner liner bolt holes 234 such that a forward end 144 of inner liner 134 abuts inner lip 270 of inner rim 228 for alignment purposes. Similarly, outer liner 136 is bolted to outer rim 230 of combustion chamber frame 200 via a plurality of bolts 146 inserted through outer liner bolt holes 236 such that a forward end 148 of outer liner 136 abuts outer lip 272 of outer rim 230 for alignment purposes. Additionally, an aft end 150 of inner liner 134 is floatingly seated against or near an inner leaf spring 152 that is coupled to a turbine nozzle 154 of high pressure turbine system 108, and an aft end 156 of outer liner 136 is floatingly seated against or near an outer leaf spring 158 that is also coupled to turbine nozzle 154 of high pressure turbine system 108. In this manner, combustion chamber frame 200 spans flow path 300 to direct a first portion 12 of compressed air 10 into combustion chamber 302, a second portion 14 of compressed air 10 into an outer liner cooling flow path 304 defined between combustor case 114 and outer liner 136, and a third portion 16 of compressed air 10 into an inner liner cooling flow path 306 defined between inner liner 134 and FINS 116.

In each combustor assembly 126, fuel nozzle 128 extends through outer casing structure 122, through one inverted substantially U-shaped outer liner cooling flow intake aperture 268, and into one eyelet 238. Mixer 132 is floatingly coupled to web 232 of combustion chamber frame 200 about eyelet 238 to circumscribe fuel nozzle 128, and each tab 240 facilitates clocking mixer 132 relative to combustion chamber frame 200 and/or providing a limit stop for radial and/or axial displacement of mixer 132 relative to combustion chamber frame 200 during assembly and operation. Igniter 130 extends through outer casing structure 122 and is coupled to outer liner 136 such that igniter 130 is in communication with combustion chamber 302.

During operation, first portion 12 of compressed air 10 flows between inner cowl 222 and outer cowl 226, through mixer 132, and into combustion chamber 302. Second portion 14 of compressed air 10 flows into outer liner cooling flow path 304 through substantially U-shaped outer liner cooling flow intake apertures 266, inverted substantially U-shaped outer line cooling flow intake apertures 268, and larger spaces 250 between groups 248, 249 of supports 246. Third portion 16 of compressed air 10 flows into inner liner cooling flow path 306 through inner liner cooling flow intake apertures 220. In this manner, mixer 132 swirls first portion 12 of compressed air 10, fuel nozzle 128 injects fuel into the swirled first portion 12, and igniter 130 ignites the mixture to produce hot combustion gases that flow out of combustion chamber 302 and into turbine nozzle 154. Second portion 14 and third portion 16 of compressed air 10 facilitate cooling outer liner 136 and inner liner 134, respectively, during the combustion process. In the exemplary embodiment, inner cowl 222 and outer cowl 226 are sized smaller to facilitate increasing first portion 12 of compressed air 10 flowing into combustion chamber 302 and decreasing second and third portions 14, 16 of compressed air 10 flowing into liner cooling flow paths 304, 306, thereby providing lower emissions of gas turbine engine 100.

Figure 10:
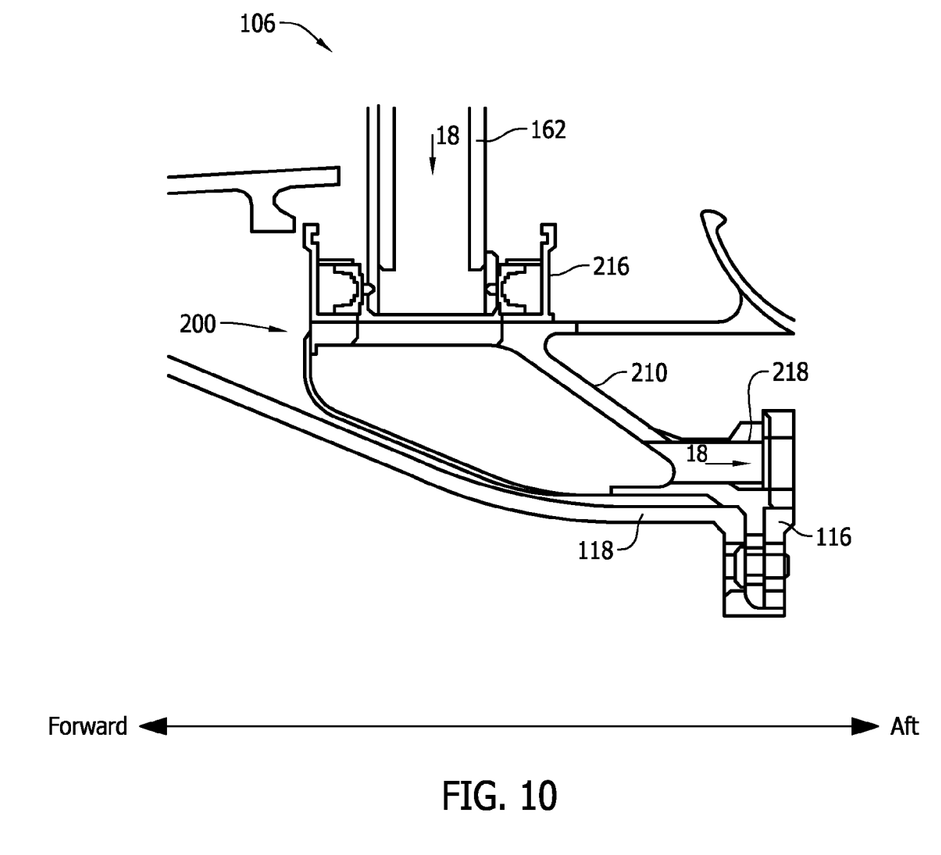
FIG. 10 is another schematic sectional illustration of the combustion system of the gas turbine engine shown in FIG. 1 having the combustion chamber frame shown in FIGS. 2-7 taken along line 10-10 of FIG. 6.

FIG. 10 is a schematic sectional illustration of combustion system 106 of gas turbine engine 100 having combustion chamber frame 200 taken along line 10-10 of FIG. 6. In the exemplary embodiment, gas turbine engine 100 also includes a turbine cooling manifold delivery system having a plurality of cooling tubes 162 that extend radially inward from outer casing structure 122 through spaces 250 between groups 248, 249 of supports 246. Cooling tubes 162 are coupled to valve adapters 216 of plenum 210 such that cooling tubes 162 channel a flow 18 of cooling air from fan system 102 and/or compressor system 104 into plenum 210. Flow 18 is directed circumferentially about combustion chamber frame 200 within plenum 210 and exits plenum 210 through outlet slots 218, thereafter flowing into high pressure turbine system 108 and/or low pressure turbine system 110 via a bypass duct 164 (FIG. 8) radially inward of inner liner cooling flow path 306.

The methods and systems described herein facilitate mounting a combustion chamber frame in a more forward and cooler region of a gas turbine engine combustion system, thereby reducing operational stresses imparted on the combustion chamber frame and increasing the useful life of the combustion chamber frame. The methods and systems described herein also facilitate coupling a combustion chamber frame to both the inner and outer casing structures for improved structural support of the combustion chamber frame with enabled radial growth of combustion chamber liners during the combustion process, thereby better absorbing operational stresses imparted on the combustion chamber frame while increasing the useful life of the combustion chamber frame. The methods and systems described herein further facilitate integrating the dome structure with the cowls, thereby reducing manufacturing costs and increasing operating efficiency by reducing airflow leakage through the junction at which the dome structure and the cowls are coupled to the combustion chamber liners.

The methods and systems described herein also facilitate enabling the use of combustion chamber liners that are not configured to structurally support the mixer, the dome structure, and/or the cowls (e.g., the liners can be fabricated from a ceramic matrix composite (CMC) material). The methods and systems described herein also facilitate locating the combustion chamber frame closer to the fuel nozzle, which provides better control over axial and radial displacement of the mixer, the dome structure, and/or the cowls relative to the fuel nozzle (e.g., facilitates reducing rotation of the mixer, the dome structure, and/or the cowls relative to the fuel nozzle), thereby reducing operational stresses imparted on the combustion chamber frame and increasing the useful life of the combustion chamber frame. Additionally, the methods and systems described herein facilitate clocking combustion system components during assembly (e.g., clocking the igniters relative to the outer liner), thereby reducing manufacturing costs.

Exemplary embodiments of a combustion system and a method of assembling the same are described above in detail. The methods and systems are not limited to the specific embodiments described herein, but rather, components of the methods and systems may be utilized independently and separately from other components described herein. For example, the methods and systems described herein may have other industrial and/or consumer applications and are not limited to practice with only gas turbine engines as described herein. Rather, the present invention can be implemented and utilized in connection with many other industries.

While the invention has been described in terms of various specific embodiments, those skilled in the art will recognize that the invention can be practiced with modification within the spirit and scope of the claims.

What is claimed is:

1. A method of assembling a combustion system for a gas turbine engine, said method comprising:
   providing a combustion chamber frame, an inner casing structure, and an outer casing structure, wherein the combustion chamber frame includes a dome structure and a cowl integrally formed with the dome structure such that forward of the dome structure the cowl extends generally radially; and
   mounting the combustion chamber frame between the inner casing structure and the outer casing structure to at least partially define a forward boundary of a combustion chamber having a forward region and an aft region such that the combustion chamber frame is coupled to the inner casing structure and the outer casing structure closer to the forward region of the combustion chamber than the aft region of the combustion chamber.

2. A method in accordance with claim 1, further comprising coupling inner and outer liners to the combustion chamber frame such that the inner and outer liners at least partially define radial boundaries of the combustion chamber.

3. A method in accordance with claim 1, wherein said providing a combustion chamber frame comprises providing the combustion chamber frame as an annular combustion chamber frame.

4. A method in accordance with claim 3, wherein said providing the combustion chamber frame as an annular combustion chamber frame comprises providing the annular combustion chamber frame with the cowl being an annular inner cowl and an annular outer cowl, and the dome structure being an annular dome structure extending from the inner cowl to the outer cowl, wherein the inner cowl, the outer cowl, and the dome structure are integrally formed together.

5. A method in accordance with claim 4, further comprising providing the combustion chamber frame with a plurality of circumferentially spaced supports that are integrally formed with the outer cowl, wherein said mounting the combustion chamber frame between the inner casing structure and the outer casing structure comprises coupling the combustion chamber frame to the outer casing structure using the supports.

6. A method in accordance with claim 4, further comprising coupling a deflector to the dome structure.

7. A combustion system for a gas turbine engine, said combustion system comprising:
   an inner casing structure;
   an outer casing structure; and
   a combustion chamber frame mounted between said inner casing structure and said outer casing structure to at least partially define a forward boundary of a combustion chamber having a forward region and an aft region such that said combustion chamber frame is coupled to said inner casing structure and said outer casing structure closer to the forward region of the combustion chamber than the aft region of the combustion chamber, wherein said combustion chamber frame comprises a dome structure and a cowl integrally formed with said dome structure such that forward of said dome structure said cowl extends generally radially.

8. A combustion system in accordance with claim 7, further comprising;
   an inner liner; and
   an outer liner, wherein said inner and outer liners are coupled to said combustion chamber frame such that said inner and outer liners at least partially define radial boundaries of the combustion chamber.

9. A combustion system in accordance with claim 7, wherein said combustion chamber frame is an annular combustion chamber frame.

10. A combustion system in accordance with claim 9, wherein said cowl comprises an annular inner cowl and an annular outer cowl, and wherein said dome structure comprises an annular dome structure extending from said inner cowl to said outer cowl, wherein said inner cowl, said outer cowl, and said dome structure are integrally formed together.

11. A combustion system in accordance with claim 10, wherein said combustion chamber frame comprises a plurality of circumferentially spaced supports that are integrally formed with said outer cowl, said supports configured for coupling said combustion chamber frame to said outer casing structure.

12. A combustion system in accordance with claim 10, further comprising a deflector coupled to said dome structure.

13. A combustion chamber frame for a gas turbine engine combustion system having an inner casing structure and an outer casing structure and defining a combustion chamber having a forward region and an aft region, said combustion chamber frame comprising:
   an inner frame segment;
   an outer frame segment; and
   an intermediate frame segment extending from said inner frame segment to said outer frame segment, wherein said combustion chamber frame is configured to be mounted between the inner casing structure and the outer casing structure to at least partially define a forward boundary of the combustion chamber such that said inner frame segment is coupled to the inner casing structure and such that said outer frame segment is coupled to the outer casing structure closer to the forward region of the combustion chamber than the aft region of the combustion chamber, wherein said intermediate frame segment comprises a dome structure and a cowl integrally formed with said dome structure such that forward of said dome structure said cowl extends generally radially.

14. A combustion chamber frame in accordance with claim 13, wherein said combustion chamber frame is configured to be coupled to inner and outer liners such that said inner and outer liners at least partially define radial boundaries of the combustion chamber.

15. A combustion chamber frame in accordance with claim 13, wherein said combustion chamber frame is an annular combustion chamber frame.

16. A combustion chamber frame in accordance with claim 15, wherein said inner frame segment comprises an annular inner flange.

17. A combustion chamber frame in accordance with claim 15, wherein said outer frame segment comprises a plurality of circumferentially spaced supports.

18. A combustion chamber frame in accordance with claim 15, wherein said cowl comprises an annular inner cowl and an annular outer cowl, said dome structure being an annular dome structure extending from said inner cowl to said outer cowl, wherein said inner cowl, said outer cowl, and said dome structure are integrally formed together.

19. A combustion chamber frame in accordance with claim 18, wherein said combustion chamber frame comprises a plurality of circumferentially spaced supports that are integrally formed with said outer cowl, said supports configured for coupling said combustion chamber frame to the outer casing structure.

20. A combustion chamber frame in accordance with claim 15, further comprising an annular plenum.

* * * * *